(12) United States Patent
Huang et al.

(10) Patent No.: US 8,015,489 B2
(45) Date of Patent: Sep. 6, 2011

(54) METHOD FOR ADDING MARKS IN THE PAGE RASTERIZING PROCESS

(75) Inventors: Weiping Huang, Beijing (CN); Junje Kang, Beijing (CN)

(73) Assignees: Peking University Founder Group Co., Ltd., Beijing (CN); Beijing Founder Electronics Co., Ltd., Beijing (CN); Peking University, Beijing (CN)

( * ) Notice: Subject to any disclaimer, the term of this patent is extended or adjusted under 35 U.S.C. 154(b) by 1083 days.

(21) Appl. No.: 11/795,679

(22) PCT Filed: Jan. 12, 2006

(86) PCT No.: PCT/CN2006/000043
§ 371 (c)(1),
(2), (4) Date: Jul. 18, 2007

(87) PCT Pub. No.: WO2006/076855
PCT Pub. Date: Jul. 27, 2006

(65) Prior Publication Data
US 2008/0130995 A1    Jun. 5, 2008

(30) Foreign Application Priority Data
Jan. 18, 2005   (CN) .......................... 2005 1 0001855

(51) Int. Cl.
*G06F 17/00* (2006.01)
(52) U.S. Cl. ........ 715/276; 715/200; 715/247; 715/249; 715/250; 715/255; 358/501; 358/487; 358/1.1; 358/1.16; 358/1.18; 382/173
(58) Field of Classification Search .................. 382/173; 358/487, 501; 715/255, 200, 247, 249, 250
See application file for complete search history.

(56) References Cited

U.S. PATENT DOCUMENTS
5,748,860 A     5/1998    Shively
(Continued)

FOREIGN PATENT DOCUMENTS
EP          0478351           4/1992
(Continued)

OTHER PUBLICATIONS

Caldera; Software for Imaging; VisualRIP; www.blanchardsystems.com/pdfs/VisualRip_en.pdf; Sep. 23, 2004.*

(Continued)

*Primary Examiner* — Cesar Paula
*Assistant Examiner* — David Faber
(74) *Attorney, Agent, or Firm* — Lowe Hauptman Ham & Berner LLP

(57) ABSTRACT

This invention relates to the field of computer image processing technology, particularly, to a method for adding marks in the process of page rasterizing, which in detail is the method for adding marks on the output medium when description files of pages are output in raster imaging devices. The description files of pages are generally PostScript file, i.e. PS file, and Portable Document Format (PDF) files, i.e. PDF file. The prior art has disadvantages of poor compatibility, slow speed and the like. The present recognizes adding various marks to description files of pages in the process of page rasterizing in an RIP, thereby it is possible to add marks to any of PS files and PDF files without pre-scanning the description files of pages, and obtain good flexibility and compatibility substantially without effects on speed.

4 Claims, 1 Drawing Sheet

U.S. PATENT DOCUMENTS

| | | | |
|---|---|---|---|
| 6,049,390 A | 4/2000 | Notredame et al. | |
| 7,072,052 B1* | 7/2006 | Tanahashi et al. | 358/1.1 |
| 2002/0066039 A1* | 5/2002 | Dent | 713/202 |
| 2002/0171871 A1* | 11/2002 | Catt et al. | 358/1.18 |
| 2003/0179419 A1* | 9/2003 | Abe | 358/474 |
| 2004/0015781 A1* | 1/2004 | Brown et al. | 715/513 |
| 2005/0012962 A1* | 1/2005 | Kido | 358/1.18 |
| 2005/0105135 A1* | 5/2005 | Takahashi | 358/1.18 |

FOREIGN PATENT DOCUMENTS

| | | |
|---|---|---|
| WO | WO 99/24933 | 5/1999 |
| WO | WO 2004/095309 | 11/2004 |

OTHER PUBLICATIONS

Supplemental European Search Report dated Nov. 20, 2008.

* cited by examiner

METHOD FOR ADDING MARKS IN THE PAGE RASTERIZING PROCESS

FIELD OF THE INVENTION

The present invention relates to the field of computer image processing technology, particularly to a method for adding marks in the process of page rasterizing.

BACKGROUND OF THE INVENTION

PostScript (i.e. PS) is a programming language for describing page contents in the computer image processing technology, which is developed by Adobe Company and widely used as page description in most of software for processing texts, graphics and images. PS has become an industry standard in the field.

Portable Document Format (i.e. PDF) is an electronic document format for describing page contents, which was developed by Adobe Company. Generally, for the same page content, a PDF file has a smaller size and a more compact structure than those of a PS file.

Raster Image Processor (i.e. RIP) is a processor for transforming page description in PS or PDF to raster images and outputting in raster imaging devices (e.g. phototypesetter, computer-to-plate equipment and printer). A RIP system mainly comprises an RIP user interface for providing users with a user-friendly graphical interface, an RIP kernel for transforming page description in PS or in PDF to raster bitmaps, and a driver for outputting the raster bitmaps to raster devices.

The term "mark" in the present disclosure generally refers to various marks to be added to margins of a page to be output, like collimating marks, clipping marks, step wedges, color plate names, margents, job file names, outputting times, page numbers, customized marks defined by a user, and so on.

The term "job file" in the present disclosure refers to a description file of pages as filed to a RIP device for rasterizing and printing. A job file is generally a PS file, a PDF file or the like. Hereinafter, the term "job PS/PDF file" refers to the job file.

In the print field, a CMYK (i.e. Cyan, Magenta, Yellow and Black printing ink) color model is used for color separation overprint. The definition of the overprint directly influences the quality of final products. To this end, collimating marks are generally added around pages to be printed. Besides, other marks like clipping marks, step wedges may be added, too.

Generally, there are three methods for adding marks. One is to directly arrange marks required by the back-end output in the front-end plate making software so that the job PS/PDF filed with a RIP includes the arranged marks. Those arranged marks actually become a part of page content in the RIP. Another is to preprocess a job file before the job PS/PDF file is filed with a RIP so that a PS stream describing marks is inserted into a page PS stream. In this way, the PS stream describing marks actually becomes a part of the preprocessed job file. The common feature of the two methods is that a job PS/PDF file filed with a RIP contains marks already, namely, the marks are added to a page before the page is rasterized by a RIP and the RIP is not responsible for adding marks. The third method is to splice stored mark bitmaps onto page bitmaps to generate the final bitmaps.

All the methods above have limitations. In the first one, an operator should be good at making plates and familiar with back-end output devices and post-press processes. On the other side, operators don't know, from time to time, what kind of back-end output devices and post-press processes will be used when plates they made are completed. This is so-called "separating editing from printing" work model, namely, making plates and editing are separated. This model does not allow operators adding marks during making plates. Instead, marks have to be added by those operators who operate back-end output devices.

Pre-processing of the second method is hard to adapt to the PS files generated by various existing typesetting software, especially to those multi-page PS files whose page description of each page is not independent. Adding marks by said pre-processing needs to add the PS stream describing the marks at the end of the page description PS stream of every page. However, the two PS streams are not compatible, resulting in that the pre-processed job file cannot be correctly interpreted in the RIP. Moreover, page-end symbols of PS files generated by different typesetting software are not uniform. Therefore, it is hard for the pre-processing program to find page-end symbols in the PS stream of the job file. It needs to specially process the PS files generated by various software or various versions of the same software. Therefore, this method cannot solve the problem of adding marks to any PS file. One more disadvantage of this method is that a job file should be pre-scanned, resulting in low efficiency.

The mentioned third method overcomes the problem of compatibility existing in the second method but the efficiency of the third becomes lower than the second one because the third one is to splice the mark bitmaps onto the page bitmaps to generate the final bitmaps. The size of the bitmaps to be processed becomes very large, especially in a raster device with high resolution.

SUMMARY OF THE INVENTION

To overcome the shortcomings of the prior art, an aspect of the present invention provides a method for adding marks in the process of page rasterizing to satisfy the need of separating editing from printing, and to add various marks to any PS file and PDF file or like, without needing pre-scanning. In another aspect, the present invention prevents the execution of the PS description file of marks from being impacted by the execution of a job PS/PDF file, namely, allowing two kinds of PS files to be independent from each other and having compatibility.

A method for adding marks in the process of page rasterizing, in one aspect, may comprise:

(1) inputting a job file in PostScript or PDF to a RIP;

(2) computing enlargements of a page after the marks are added to the job file and generating a description file of the marks in light of types of the marks selected by a user;

(3) switching an execution environment of the RIP to execute the description file of the marks after a page of the job file is interpreted by the RIP so that the marks are added and incorporated into a content of the page; and (4) switching the execution environment of the RIP back after executing the description file of the marks, so as to proceed to interpret and execute a next page;

wherein adding the marks in the step (3) is conducted in the process of page rasterizing inside the RIP and the marks are positioned in light of a size of an original page.

Further, the marks in step (2) may include collimating marks, clipping line marks, step wedges, color plate names, margents, job file names, outputting times or customized marks defined by the user, or combinations thereof.

The description file of the marks in the step (2) may be a PostScript file, i.e. a PS file.

Further, a protective mechanism may be used when a status of the RIP is switched between executing a job file and executing a PS description file of the marks in the steps (3) and (4).

The protective mechanism in the steps (3) and (4) may comprise steps of:

(1) pushing a system dictionary "systemdict", a global dictionary "globaldict" and a user dictionary "userdict" defined in a PS language standard into a dictionary stack of a kernel of the RIP;

(2) executing a saving operator "save" defined in the standard;

(3) executing an initialization graphics state operator "initgraphics" defined in the standard;

(4) setting an origin of a current coordinate at a bottom left corner of the page of the job file to which the marks have been added, wherein a unit of $1/72.0$ inch and directions of the coordinate are consistent with those of a default coordinate defined in the standard;

(5) setting a current clipping as the page of the job file which the marks have been added to;

(6) setting a current point at the bottom left corner of the page of the job file to which the marks have been added and setting a current path as "empty";

(7) pushing parameters into an operand stack of the kernel of the RIP, wherein, if the job file is a composite file, the parameters include the size of the original page before adding the marks and Boolean quantity "false", and if the job file is a color pre-separation file, the parameters include the size of the original page before adding the marks, a current processed color plate name string and the Boolean quantity "true";

(8) interpreting and executing the PS description file of the marks;

(9) executing a restoration operator "restore" defined in the standard;

(10) popping the user dictionary "userdict", the global dictionary "globaldict" and the system dictionary "systemdict" out from the dictionary stack; and

(11) executing sequentially the next page of the job file.

According to one embodiment of the present invention, separating editing from printing can be achieved and various marks can be added to a PS/PDF file, without needing pre-scanning the job file. Since the added marks are described in PS language, the description can be implemented flexibly, the positions and contents of the marks can be dynamically set, and any customized marks can be added by the user. Another advantage may be to prevent the execution of the PS file with marks from being impacted by the job PS/PDF file, meanwhile, ensuring the execution of the job PS/PDF file normally. Namely, the RIP can interpret and execute the two files, respectively.

According to one embodiment of the invention, the RIP user can add collimating marks, clipping line marks, step wedges, color plate names, margents, job file names, outputting times, or customized marks or combinations thereof, in the margin of a page of the job file. The advantage is that the user can add various marks at the end of outputting the actual file. Moreover, since the added marks are described in the PS language, executing the job file having marks is not impacted by the execution of the job file. That is to say, the two kinds of PS files are independent from each other.

DESCRIPTION OF THE PREFERRED EMBODIMENTS

Hereinafter, a detailed description of the present invention will be given with reference to the appended drawings and embodiments.

The present invention provides a method for adding marks in the process of page rasterizing comprising the following steps in one embodiment.

Figure 2:
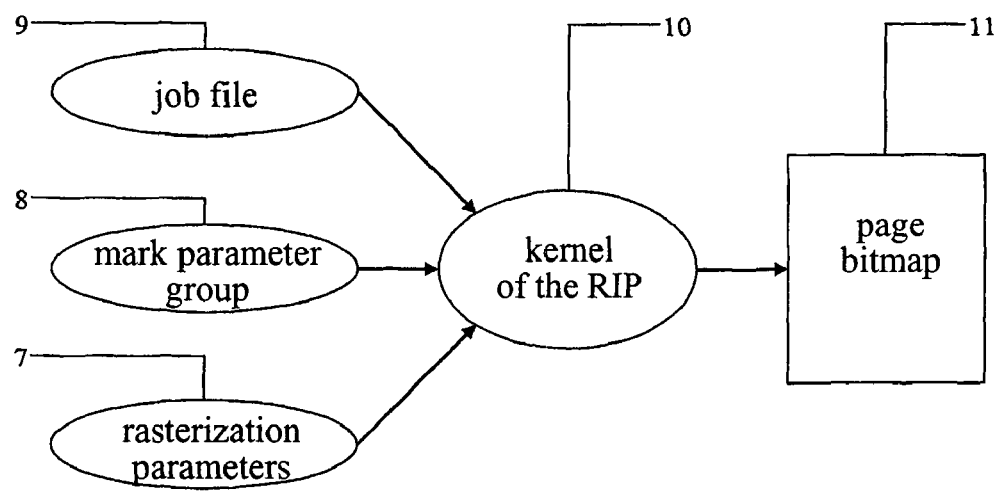
FIG. 2 is a schematic view showing the process of the RIP for adding marks to the job file.

Step 1 is to input a PS or a PDF job file 9 as filed by a user into an RIP (Raster Image Processor) 10 as shown in FIG. 2.

Figure 1:
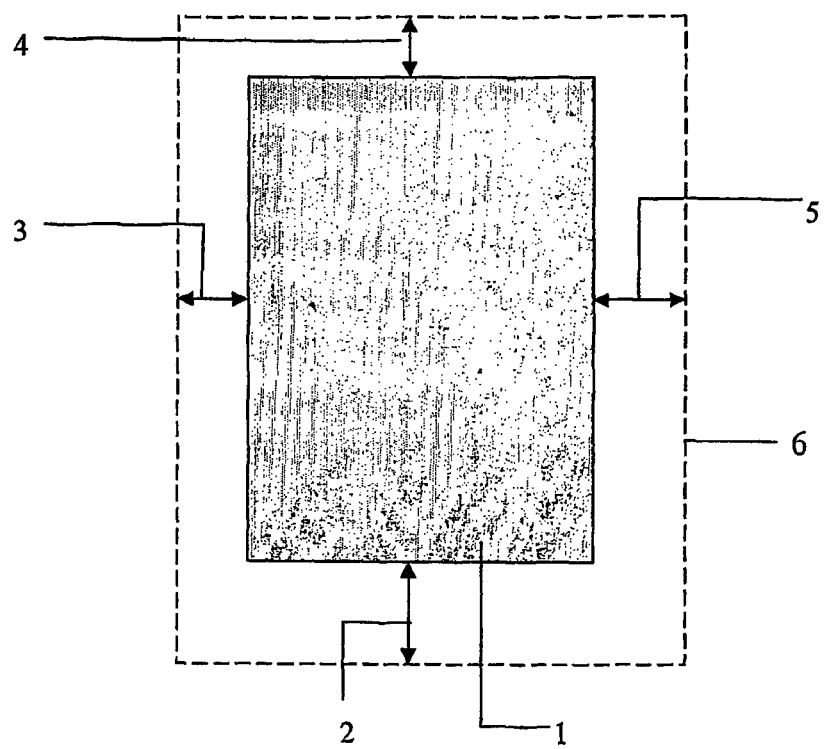
FIG. 1 is a schematic view showing the change of the page of a job file with and without marks.

Adding various marks to the job file may be achieved in the RIP according to the present invention. After inputting the PS or PDF job file to the RIP, enlargements of the page 1 of the original page are calculated, including a bottom enlargement 2, a left enlargement 3, a top enlargement 4 and a right enlargement 5, all of which forms a mark parameter group 8. These enlargements are easily obtained according to the type of marks selected on the RIP interface by the user and the distance between the marks and the page. The page 6 to which marks have been added is shown in FIG. 1.

Step 2 is to describe the added marks in the PS language.

All the marks added to the page are described by a corresponding PS language description file (hereafter call "PS description file of marks"). The PS description file of marks can be automatically generated by the RIP according to the types of the marks. The origin of a coordinate used for describing the marks by the PS description file of marks is at the bottom left corner of the dashed frame shown in FIG. 1. The unit and the directions of the coordinate are consistent with those of the default coordinate defined in the PS standard (i.e. the coordinate unit is $1/72.0$ inch). The original graphics state in use is consistent with the default graphics state at the beginning of a PS file as defined in the PS standard. When a mark is added using PS instructions, it can be only added to the mark region, in principle, so as to avoid overlapping with the original page content. The PS instructions in use should comply with the EPS (i.e. encapsulated PS) standard defined in the PS standard. The RIP 10 may automatically execute the PS description file of marks timely to add the corresponding marks to the rasterizing page. Before the PS description file of marks is executed every time, the RIP pushes parameters into an operand stack defined in the PS language so that the PS description file of marks can dynamically set positions and contents of the marks accordingly. The parameters may include the size of the original job page, a judgment on whether the job file is a color pre-separation file, and so on. The term "dynamically" means that, in view of the original job page, a collimating mark may be set to be a centered mark relative to the original job page, so that the PS description file of marks can obtain the size of the original job page from the operand stack of the RIP and then compute the actual position of the centered collimating mark.

In step 3, according to preset rasterization parameters 7, after the page content of a certain page of the job file is interpreted by the RIP 10, the execution environment of the RIP 10 is switched to execute a PS file which describes the marks, so as to add marks and incorporate the added marks into the original page content.

Step 4 is to switch back the execution environment of the RIP 10 to proceed to interpret and execute the next page, after executing the PS file which describes the marks.

In the step 3, adding various marks to the job file may be achieved inside the RIP. The execution of the PS description file of marks is dynamic according to the parameters which are characterized in the size of the original job page, the judgment on whether the job file is a color pre-separation file, and so on.

A protective mechanism is used in the process of switching the statuses of the RIP 10 between executing a user PS stream and executing a mark PS stream, so that the execution of the PS description file of marks is not impacted by the execution of the job PS/PDF file, say, the two files are independent from each other.

The process of adding marks in the process of page rasterization in one embodiment may comprise the following steps.

In step 1, an interpreter of the RIP 10 enlarges the page 1 once the actual size of the page 1 is obtained in the process of interpreting a PS/PDF job file. The enlargements are the left, right, top and bottom enlargements as computed above. The size of the enlarged page 6 is the size of the raster bitmap to be generated. Then, the origin of the device coordinate is set at the bottom left corner shown in the dashed frame shown in FIG. 1 and the origin of the coordinate of the current user is set at the bottom left corner of the gray rectangle shown in FIG. 1. A transformation matrix from the current user coordinate to the device coordinate is set as the current transformation matrix (CTM) in the RIP. Meanwhile, the default clipping path is set as the gray rectangle shown in FIG. 1.

In step 2, the status of the RIP 10 is switched from interpreting and executing the PS/PDF job file as filed by the user to the status of interpreting and executing the PS description file of marks, when a PS instruction "showpage" is executed by the RIP 10, or after the execution of one page content stream of the PDF file is completed. The interpretation and execution of the PS description file of marks may be the same or similar to those of a common PS file. All the marks are automatically added to the mark region of the raster page after the execution of the PS description file of marks is completed. In this way, incorporating the marks into the original page is realized. The RIP adds the whole page obtained by the incorporation to the raster page to generate a raster bitmap 11. The status of the RIP 10 is switched back from interpreting and executing the PS description file of marks to the status of interpreting and executing the job file, and proceeds to interpret and execute the next page sequentially. In order to ensure the switch between the two statuses and the independence from each other, the execution environment of the interpreter of the RIP should not be destroyed when the switch occurs. To this end, the RIP executes the following steps:

1) pushing "systemdict", "globaldict" and "userdict" defined in the PS language standard into a dictionary stack in the RIP;

2) executing the operator "save" defined in the standard;

3) executing the operator "initgraphics" defined in the standard;

4) setting the origin of the current user coordinate at the bottom left corner of the dashed frame shown in FIG. 1, wherein the unit and the directions of the coordinate are consistent with those of the default coordinate defined in the PS standard (i.e. the coordinate unit is $1/72.0$ inch);

5) setting the current clipping as the dashed frame shown in FIG. 1;

6) setting the current point at the point of the bottom left corner of the dashed frame shown in FIG. 1 and setting the current path as "empty";

7) pushing parameters into the operand stack in the RIP, wherein, if the user PS file or PDF file is a composite file, the parameters may include the size of the original page before adding the marks and Boolean quantity "false", if the user PS file or PDF file is a color pre-separation file, the parameters may include the size of the original page before adding the marks, the current processed color plate name string and Boolean quantity "true";

8) interpreting and executing the PS description file of marks;

9) executing the operator "restore" defined in the standard;

10) popping the "userdict", "globaldict" and "systemdict" out from the dictionary stack; and 11) executing sequentially the next page of the user PS file or PDF file.

It is noted that each of the operators mentioned above should not be replaced with the corresponding PS name. The reason is that, since any name in a PS file can be redefined, the name of an operator may be repeatedly redefined in the job PS file, causing that the execution of the job PS file may interfere with the execution of the PS description file of marks. Direct execution of the operators internally predefined in the RIP can fully solve the problem.

From the above, it is also noted that, similar to pre-processing a PS file to add marks, adding marks to a PS file in the process of page rasterizing according to the invention also describes marks in PS language, and additionally executes a PS description file of marks at the end of a page description to realize the incorporation of the marks and the original page. However, the present invention differs essentially from the prior art that, according to the invention, adding marks in the page rasterizing process is fully implemented in the RIP and can add marks to any PS file. To the contrary, adding marks through preprocessing the PS file can add marks only to the PS file which is generated by a specific version of specific software. So, this method lacks compatibility and often has a failure of adding marks. Moreover, the method of the present invention has a higher efficiency than the prior art because there is no pre-processing step. For the same job file, the processing speed with adding marks is almost the same as that without adding marks. Further, the method in the present invention adapts to not only PS files but also PDF files, while the preprocessing method may need a different step for PDF files since the structure of a PDF file is different from that of a PS file.

Finally, it will be understood by those skilled in the art that the foregoing description is of preferred embodiments of the methods and devices, and that various changes and modifications may be made to the present invention without departing from the spirit and scope thereof.

The invention claimed is:

1. A method for adding marks in a process of page rasterizing, comprising:
    (1) inputting a job file in PostScript or Portable Document Format (PDF) to a Raster Image Processor (RIP);
    (2) computing enlargements of a page after the marks are added to the job file and generating a description file of the marks in light of types of the marks selected by a user;
    (3) switching an execution environment to execute the description file of the marks after a page of the job file is interpreted by the RIP so that the marks are added and incorporated into a content of the page; and
    (4) switching the execution environment of the RIP back after executing the description file of the marks, so as to proceed to interpret and execute the next page;
    wherein adding the marks in the step (3) is conducted in a process of page rasterizing inside the RIP and the marks are positioned in light of a size of an original page,
    wherein the description file of the marks in the step (2) is a PostScript file and a protective mechanism is used when a status of the RIP is switched between executing the job file and executing the PostScript description file of the marks in the steps (3) and (4), and wherein the protective mechanism comprises steps of:
(1') pushing a system dictionary "systemdict", a global dictionary "globaldict" and a user dictionary "userdict" defined in a PostScript language standard into a dictionary stack of a kernel of the RIP;
(2') executing a saving operator "save" defined in the standard;
(3') executing an initialization graphics state operator "initgraphics" defined in the standard;
(4') setting an origin of a current coordinate at a bottom left corner of the page of the job file to which the marks have been added, wherein a unit of 1/72.0 inch and directions of the coordinate are consistent with those of a default coordinate defined in the standard;
(5') setting a current clipping as the page of the job file to which the marks have been added;
(6') setting a current point as the point of the bottom left corner of the page of the job file to which the marks have been added and setting a current path as "empty";
(7') pushing parameters into an operand stack of the kernel of the RIP, wherein, if the job file is a composite file, the parameters include the size of the original page before adding the marks and Boolean quantity "false", and if the job file is a color pre-separation file, the parameters include the size of the original page before adding the marks, a current processed color plate name string and the Boolean quantity "true";
(8') interpreting and executing the PostScript description file of the marks;
(9') executing a restoration operator "restore" defined in the standard;
(10') popping the user dictionary "userdict", the global dictionary "globaldict" and the system dictionary "systemdict" out from the dictionary stack; and
(11') executing sequentially the next page of the job file.

2. The method for adding marks in the process of page rasterizing as defined in claim 1, wherein the marks in the step (2) include collimating marks, clipping line marks, step wedges, color plate names, margents, job file names, outputting times or customized marks defined by the user or combinations thereof.

3. A method of adding marks in a process of page rasterizing, comprising:
(1) inputting a job file in a format of PostScript or Portable Document Format (PDF) to a Raster Image Processor (RIP);
(2) computing a size of a mark region of a page after the marks are added to the job file and generating a description file of the marks in light of types of the marks selected by a user;
(3) switching an execution environment of the RIP to execute the description file of the marks after the page of the job file is interpreted by the RIP so that the marks are added and incorporated into a content of the page; and
(4) switching the execution environment of the RIP to process a next page of the job file after executing the description file of the marks;

wherein the addition of the marks in operation (3) is performed in a process of page rasterizing inside the RIP, and the marks are positioned in light of a size of an original page, wherein the description file of the marks in the operation (2) is a PostScript file, wherein the method further comprises using a protective mechanism when a status of the RIP is switched between executing the job file and executing the PostScript description file of the marks in the operations (3) and (4), and wherein the protective mechanism comprises:
(1') pushing a system dictionary "systemdict," a global dictionary "globaldict," and a user dictionary "userdict" defined in a PostScript file language standard into a dictionary stack of a kernel of the RIP;
(2') executing a saving operator "save" defined in the standard;
(3') executing an initialization graphics state operator "initgraphics" defined in the standard;
(4') setting an origin of a current coordinate at a bottom left corner of the page of the job file to which the marks have been added, wherein a unit of 1/72.0 inch and directions of the coordinate are consistent with those of a default coordinate defined in the standard;
(5') setting a current clipping as the page of the job file to which the marks have been added;
(6') setting a current point as the point of the bottom left corner of the page of the job file to which the marks have been added and setting a current path as "empty";
(7') pushing parameters into an operand stack of the kernel of the RIP, wherein, if the job file is a composite file, the parameters include the size of the original page before adding the marks and Boolean quantity "false", and if the job file is a color pre-separation file, the parameters include the size of the original page before adding the marks, a current processed color plate name string and the Boolean quantity "true";
(8') interpreting and executing the PostScript file description file of the marks;
(9') executing a restoration operator "restore" defined in the standard;
(10') popping the user dictionary "userdict," the global dictionary "globaldict," and the system dictionary "systemdict" out from the dictionary stack; and
(11') executing sequentially the next page of the job file.

4. The method of claim 3, wherein the marks in operation (2) include collimating marks, clipping line marks, step wedges, color plate names, margents, job file names, outputting times, customized marks defined by the user, or combinations thereof.

* * * * *